United States Patent
Catherwood et al.

(10) Patent No.: US 12,001,270 B2
(45) Date of Patent: Jun. 4, 2024

(54) VECTOR FETCH BUS ERROR HANDLING

(71) Applicant: Microchip Technology Incorporated, Chandler, AZ (US)

(72) Inventors: Michael Catherwood, Tyler, TX (US); David Mickey, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 36 days.

(21) Appl. No.: 18/075,458

(22) Filed: Dec. 6, 2022

(65) Prior Publication Data

US 2023/0176937 A1 Jun. 8, 2023

Related U.S. Application Data

(60) Provisional application No. 63/286,643, filed on Dec. 7, 2021.

(51) Int. Cl.
*G06F 11/00* (2006.01)
*G06F 9/30* (2018.01)
*G06F 11/07* (2006.01)

(52) U.S. Cl.
CPC ...... *G06F 11/0745* (2013.01); *G06F 9/30101* (2013.01)

(58) Field of Classification Search
CPC .......... G06F 11/0745; G06F 9/30101
USPC ...................................... 714/1–57
See application file for complete search history.

(56) References Cited

U.S. PATENT DOCUMENTS

| | | | |
|---|---|---|---|
| 2002/0112203 A1* | 8/2002 | Andress | G06F 11/0712 714/48 |
| 2005/0160316 A1* | 7/2005 | Shipton | B41J 2/04541 714/22 |
| 2008/0082861 A1 | 4/2008 | Sasazaki | 714/5.11 |
| 2008/0209277 A1* | 8/2008 | Sasazaki | G06F 11/1068 714/E11.038 |
| 2008/0313368 A1* | 12/2008 | Kuo | G06F 13/423 710/57 |
| 2018/0336108 A1* | 11/2018 | Battle | G06F 11/1666 |
| 2021/0004229 A1* | 1/2021 | Benisty | G06F 9/30036 |

OTHER PUBLICATIONS

International Search Report and Written Opinion, Application No. PCT/US2022/052087, 13 pages, May 4, 2023.

* cited by examiner

*Primary Examiner* — Sarai E Butler
(74) *Attorney, Agent, or Firm* — SLAYDEN GRUBERT BEARD PLLC

(57) ABSTRACT

A computer system includes a non-transitory computer-readable memory to store (a) a vector table including an exception vector pointing to an exception handler and (b) a vector fail address of a vector fetch bus error handler, and a processor to identify an exception, initiate an exception vector fetch in response to the identified exception to read the exception vector from the vector table, identify a vector fetch bus error associated with the exception vector fetch, access the vector fail address of the vector fetch bus error handler in response to the vector fetch bus error, and execute the vector fetch bus error handler.

17 Claims, 4 Drawing Sheets

VECTOR FETCH BUS ERROR HANDLING

RELATED APPLICATION

This application claims priority to commonly owned U.S. Provisional Patent Application No. 63/286,643 filed Dec. 7, 2021, the entire contents of which are hereby incorporated by reference for all purposes.

TECHNICAL FIELD

The present disclosure relates to computer processing, and more particularly to systems and methods to handle a vector fetch bus error, e.g., a bus error that occurs during an exception vector fetch (read).

BACKGROUND

In computer processing, when an exception occurs, the processor must locate and execute an exception handler (handler code) that corresponds to the exception. The location in memory where an exception handler is stored is called an exception vector. In some processor architectures, exception vectors are stored in a table, called an exception vector table, or simply a vector table. When an exception occurs (e.g., a bus error or other exception), the processor reads a corresponding exception vector from the exception vector table, referred to herein as an "exception vector fetch," and loads and executes the exception handler located at the exception vector. However, in some instances a bus error occurs during the exception vector fetch, which may cause a catastrophic error. For example, the processor may enter a continuous error process, or "hang."

There is a need for improved error handling, e.g., to handle a bus error occurring during an exception vector fetch.

SUMMARY

The present disclosure provides systems and methods to handle a bus error that occurs while reading (fetching) an exception vector from a vector table, referred to herein as a "vector fetch bus error." A vector fetch bus error can be catastrophic as the vector value returned is erroneous. Accordingly, to handle a vector fetch bus error as disclosed herein, the processor (e.g., CPU) may recognize the occurrence of the vector fetch bus error, (optionally) set a vector fail status flag in a designated register (e.g., a status register), and substitute the failed exception vector with a "vector fail address" pointing to a vector fetch bus error handler to handle the vector fetch bus error.

One aspect provides a computer system including non-transitory computer-readable memory to store (a) a vector table including an exception vector pointing to an exception handler and (b) a vector fail address of a vector fetch bus error handler, and a processor to identify an exception, initiate an exception vector fetch in response to the identified exception to read the exception vector from the vector table, identify a vector fetch bus error associated with the exception vector fetch, access the vector fail address of the vector fetch bus error handler in response to the vector fetch bus error, and execute the vector fetch bus error handler.

In some examples, the exception handler comprises a bus error handler, and the exception comprises a bus error.

In some examples, the bus error handler comprises the vector fetch bus error handler. In other examples, the vector fetch bus error handler is separate from the bus error handler.

In some examples, the processor to set a vector fail status flag in a status register in response to identification of the vector fetch bus error associated with the exception vector fetch.

In some examples, the non-transitory computer-readable memory comprises a flash memory to store the vector table.

In some examples, the non-transitory computer-readable memory comprises a register to store the vector fail address of the vector fetch bus error handler.

In some examples, the non-transitory computer-readable memory comprises a special function register of the processor to store the vector fail address of the vector fetch bus error handler.

One aspect provides a method. The method includes identifying, by a processor, an exception. The method further includes in response to the identified exception, initiating, by the processor, an exception vector fetch to read an exception vector from a vector table stored in non-transitory computer-readable memory. The method further includes identifying, by the processor, a vector fetch bus error associated with the exception vector fetch. The method further includes in response to the vector fetch bus error: accessing, by the processor, a vector fail address stored in non-transitory computer-readable memory, the vector fail address pointing to a vector fetch bus error handler, and executing, by the processor, the vector fetch bus error handler.

In some examples, the exception comprises a bus error, and the exception vector points to a bus error handler.

In some examples, the bus error handler comprises the vector fetch bus error handler.

In some examples, prior to identifying the exception, the processor identifies a non-vector fetch bus error comprising a bus error unrelated to a vector fetch, and effects a first execution of the bus error handler including executing a first recovery operation associated with the non-vector fetch bus error. The processor sets a vector fail status flag in a status register in response to identifying the vector fetch bus error associated with the exception vector fetch. Executing the vector fetch bus error handler in response to the vector fetch bus error comprises effecting a second execution of the bus error handler, including identifying the vector fail status flag in the status register, and in response to the identified vector fail status flag in the status register, executing a second recovery operation associated with the vector fetch bus error, wherein the second recovery operation is different than the first recovery operation.

In some examples, the vector fetch bus error handler is separate from the bus error handler.

In some examples, the processor sets a vector fail status flag in a status register in response to the identified vector fetch bus error.

In some examples, accessing, by the processor, the vector fail address stored in non-transitory computer-readable memory comprises accessing the vector fail address from a register of the processor.

One aspect provides a method including a processor identifying an exception; the processor initiating an exception vector fetch in response to the identified exception to read an exception vector from a vector table stored in non-transitory computer-readable memory; the processor identifying a vector fetch bus error associated with the exception vector fetch; and in response to the identified vector fetch bus error, the processor accessing a user-configurable special function register. If the accessed special function register stores a user-specified vector fail address pointing to the vector fetch bus error handler, the processor accesses and executes the vector fetch bus error handler.

Alternatively, if the accessed special function register stores a reset address, the processor accesses the reset address thereby resetting the processor.

In some examples, the exception comprises a bus error, and the exception vector points to a bus error handler.

In some examples, the bus error handler comprises the vector fetch bus error handler. In other examples, the vector fetch bus error handler is separate from the bus error handler.

In some examples, prior to identifying the exception, the processor stores the reset address in the user-configurable special function register, and subsequently replaces the reset address in the user-configurable special function register with a user-specified vector fail address in response to a user input.

BRIEF DESCRIPTION OF THE DRAWINGS

Example aspects of the present disclosure are described below in conjunction with the figures, in which.

Figure 1:
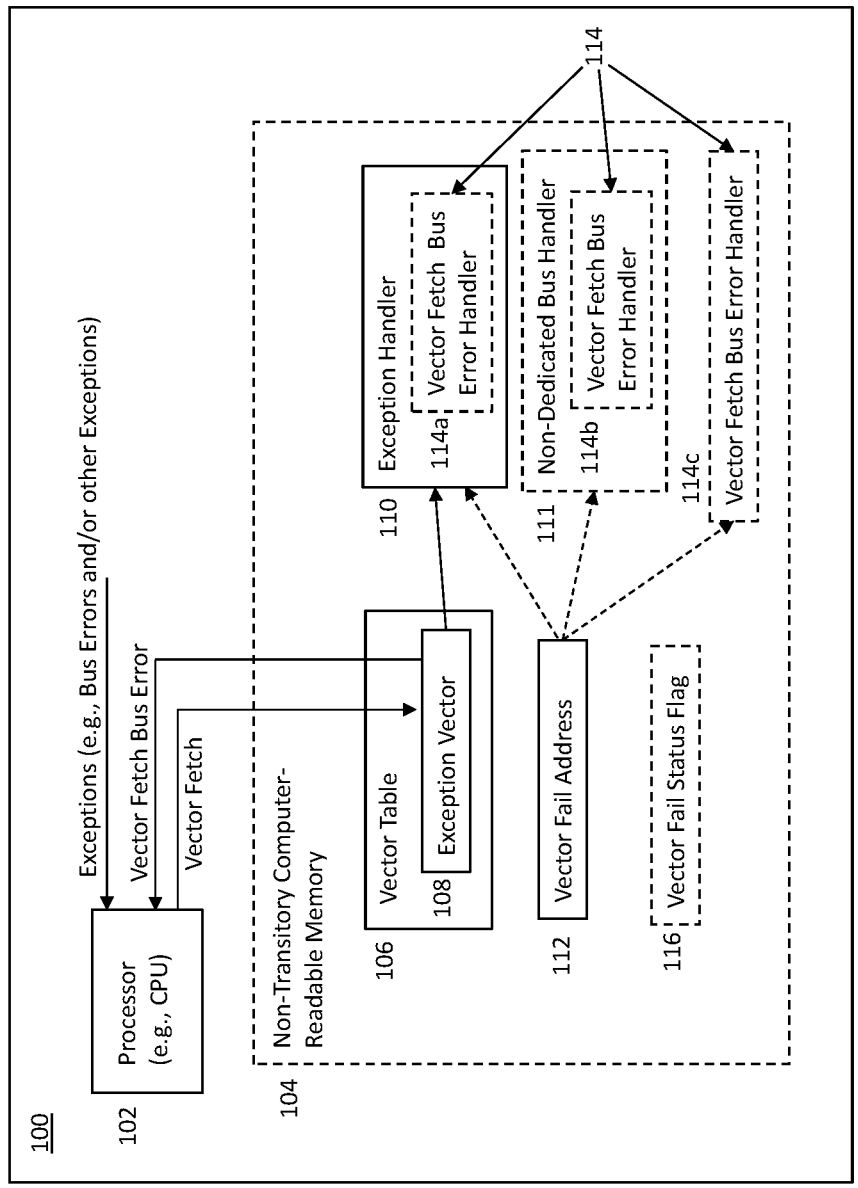
FIG. 1 shows an example system (e.g., computer system) to handle a vector fetch bus error, according to some examples.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

The present disclosure provides systems and methods to handle a vector fetch bus error that occurs when reading (fetching) an exception vector from a vector table. The exception vector may be referred to herein as a "failed exception vector," and the underlying exception associated with the exception vector may be referred to herein as a "failed exception." As disclosed herein, a processor (e.g., central processing unit (CPU)) may recognize the occurrence of a vector fetch bus error, (optionally) set a vector fail status flag in a designated register (e.g., a status register), and substitute the failed exception vector with a "vector fail address" pointing to a vector fetch bus error handler to handle the vector fetch bus error. A vector fetch bus error can have various causes. In some instances, a vector fetch bus error may result from hardware associated with a memory storage access recognizing that something has failed during that transaction. For example, error correction code (ECC) logic may detect an uncorrectable data error during a flash memory read (e.g., vector table read).

In some examples, the vector fetch bus error handler (located at the vector fail address) may be a dedicated bus error handler to handle vector fetch bus errors. In other examples, an existing bus error handler that handles various bus errors (for example, a bus error that prompted the failed vector fetch) may also function as the vector fetch bus error handler to handle vector fetch bus errors, such that the vector fail address may point to this existing bus error handler.

The vector fail address (VFA) may be stored in a VFA register, e.g., a dedicated special function register (SFR) in the processor. A user (e.g., programmer) may initialize the VFA register with the vector fail address pointing to the vector fetch bus error handler. In some example, the processor is programmed to capture and transparently load a reset address (e.g., first instruction address) into the VFA register during the processor's reset sequence, to provide a viable default value for a situation in which the user does not initialize the VFA register. In such example, if the user does not initialize the VFA register, a vector fetch bus error causes the processor to access the reset address in the VFA register, which triggers a reset (e.g., a soft reset) of the processor.

In some examples, the vector substitution (i.e., substitution of the failed exception vector with the vector fail address) is performed in the event of a vector fetch bus error, but not for other types of errors. In some examples, when a vector fetch bus error occurs, if the VFA register contains the vector fail address, exception processing continues (e.g., by a respective interrupt controller associated with the processor) and enters the recover bus error handler, and any original exception is abandoned (but remains pending).

In some examples, the processor (e.g. using the respective interrupt controller) may capture state information of the failed exception (e.g., interrupt level register (ILR) and vector number register (VNR) of the failed exception) in a predetermined register, e.g. an INTTREG register, rather than the state of the vector fetch bus error (because no bus error exception request is issued by the processor). The vector fetch bus error handler may use this state information to decide a course of action, e.g., in the event the vector fetch bus error handler finds the vector fail status flag set (indicating the occurrence of a vector fetch bus error), or alternatively in an implementation in which the vector fetch bus error handler is a dedicated bus error handler. If the vector fetch bus error handler determines the vector fetch bus error is transient, the vector fetch bus error handler may safely return to retry the failed exception. Otherwise (i.e., if the vector fetch bus error handler determines the vector fetch bus error is enduring), the vector fetch bus error handler may take another course of action defined by the user (e.g., programmer). The vector fetch bus error handler may automatically clear the vector fail status flag upon vector fetch bus error handler exit.

FIG. 1 shows an example system (e.g., computer system) 100 to handle a vector fetch bus error, according to some examples. System 100 includes a processor 102 and a non-transitory computer readable memory 104. Processor 102 may comprise a central processing unit (CPU), microprocessor, microcontroller, processor core(s), or any other type of computer processor. Processor 102 may have access to respective interrupt controllers to handle various exceptions, e.g., interrupts and traps.

Non-transitory computer readable memory 104 may include one or more types and/or instances of computer memory devices, for example one or more volatile memory devices and/or non-volatile memory devices. For example, at least a portion of non-transitory computer readable memory 104 may include one or more of the following: read-only memory (ROM) (e.g., erasable programmable ROM (EPROM), electrically erasable programmable ROM (EEPROM)), flash memory, random access memory (RAM), cache memory, and processor registers. Non-transitory computer readable memory 104 is also referred to herein as memory 104 for convenience.

In some examples, memory 104 includes respective memory locations to store a vector table 106 including an exception vector 108 pointing to an exception handler 110, a vector fail address 112 pointing to a vector fetch bus error handler 114, and optionally (c) a vector fail status flag 116. Any of the vector table 106, vector fail address 112, exception handler 110, vector fetch bus error handler 114, and (optional) vector fail status flag 116 may be stored in respective memory locations in the same or separate instances and/or types of memory 104. For example, as discussed below with reference to FIG. 2, in one example the vector table 106 is stored in RAM, the vector fail address 112 is stored in a VFA register, e.g., a special function register (SFR) in the processor 104, the (optional) vector fail status flag 116 is stored in a vector fail flag register (e.g., a dedicated status register in the processor 104), and the exception handler 110 and vector fetch bus error handler 114 are stored in non-volatile memory (e.g., flash memory or ROM).

The vector table 106 (e.g., an interrupt vector table (IVT)) may include multiple exception vectors pointing to respective exception handlers, including the exception vector 108 pointing to the exception handler 110. The exception handler 110 may be a bus error handler or other type of exception handler, including executable code (executable by the processor 102) for handling bus errors or other exceptions. Similarly, the vector fetch bus error handler includes executable code (executable by the processor 102) for handling a particular type of bus error, namely vector fetch bus errors.

Figure 3:
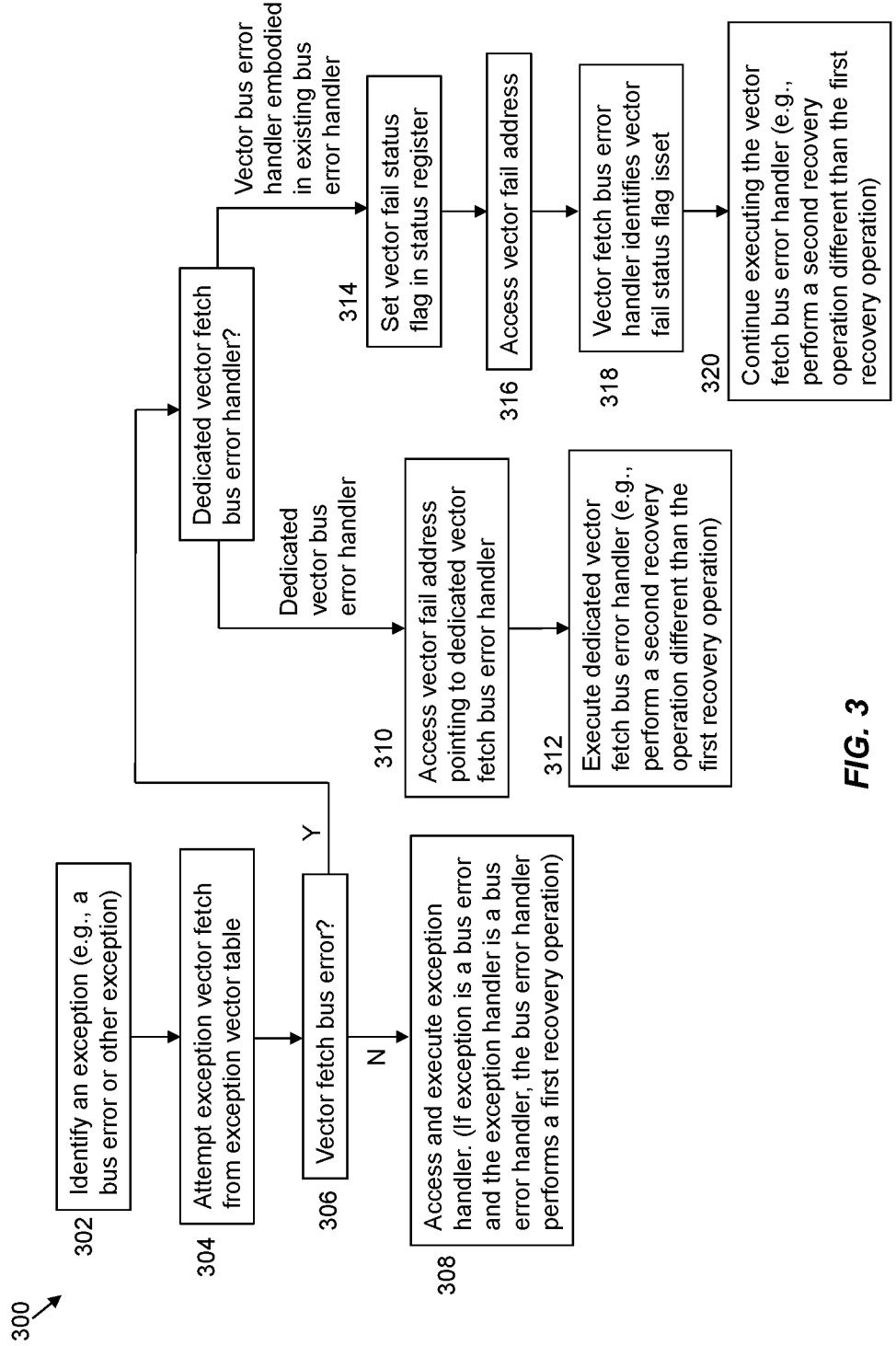
FIG. 3 shows an example process to handle a vector fetch bus error, e.g., by an example system as shown in FIGS. 1-2.

As noted above, the vector fetch bus error handler 114 may be dedicated bus error handler for handling vector fetch bus errors, or may be embodied in an existing bus error handler, i.e., a bus error handler that handles other bus errors, i.e., non-vector fetch bus errors. FIG. 3 illustrates three example implementations of the vector fetch bus error handler 114. As shown, the vector fetch bus error handler 114 may be (a) embodied in the exception handler 110 (e.g., in an example in which the exception handler 110 is a bus error handler), or (b) embodied in an (optional) bus error handler separate from the exception handler 110, referred to as a non-dedicated bus error handler 111, or (c) provided as a dedicated bus error handler for handing (i.e., recovering from) vector fetch bus errors. The vector fetch bus error handler 114 embodied in the exception handler 110 is indicated at 114a; the vector fetch bus error handler 114 embodied in a non-dedicated bus error handler 111 is indicated at 114b; and the vector fetch bus error handler 114 provided as a dedicated bus error handler is indicated at 114c.

In example implementations in which the vector fetch bus error handler 114 is embodied in an existing bus handler (e.g., the exception handler 110 or non-dedicated bus error handler 111), the existing bus handler may handle non-vector fetch bus errors and also vector fetch bus errors. In such implementations, the existing bus handler (e.g., exception handler 110 or non-dedicated bus error handler 111) may utilize the (optional) vector fail status flag 116, which is automatically set by the processor 102 in response to a vector fetch bus error, to identify a respective bus error is a vector fetch bus error (as opposed to a non-vector fetch bus error), e.g., in order to take an appropriate action to recover from a vector fetch bus error.

In example implementations in which the vector fetch bus error handler 114 is embodied in an existing bus handler (e.g., exception handler 110 or non-dedicated bus error handler 111), the vector fail address 112 points to the relevant existing bus handler (e.g., exception handler 110 or non-dedicated bus error handler 111).

Figure 2:
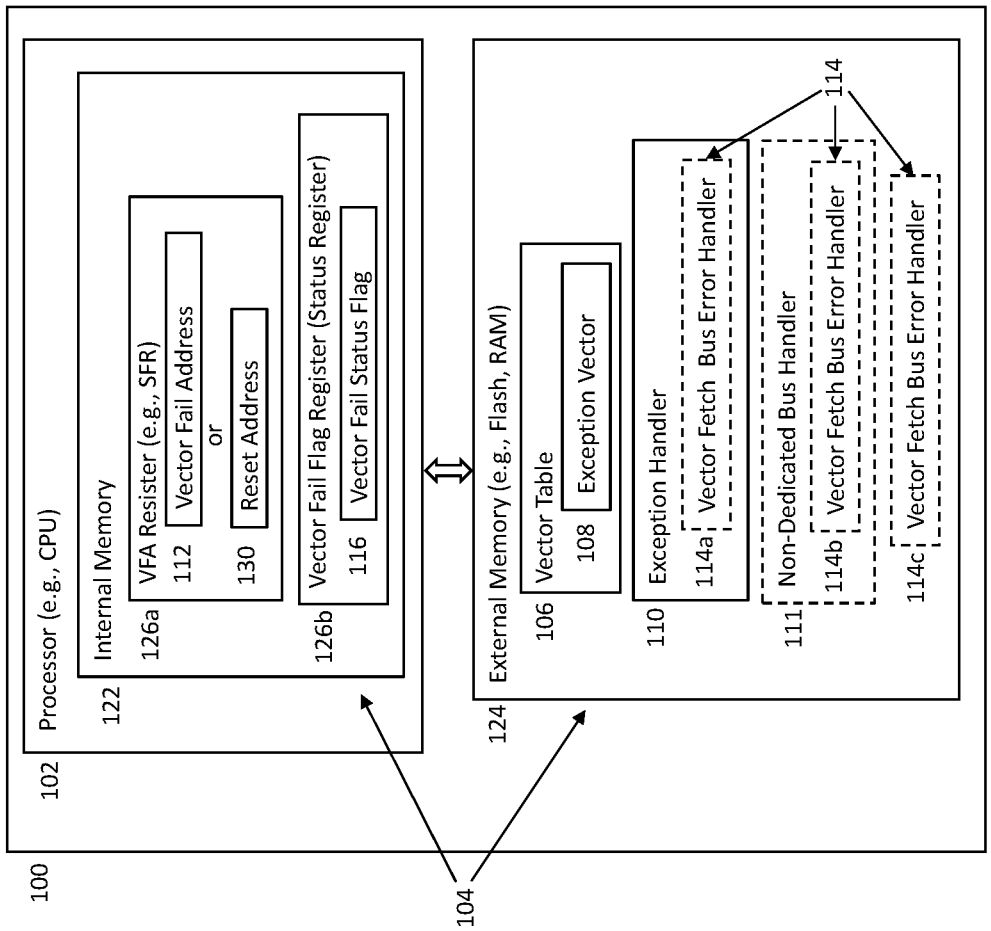
FIG. 2 shows example memory locations for various information related to the example system shown in FIG. 1.

FIG. 2 shows aspects of the example system (e.g., computer system) 100, illustrating storage of various information, according to one example. As shown, memory 104 of system 100 may include internal memory 122 of processor 102 and external memory 124 external to processor 102. In this example, the internal memory 122 of processor 102 includes (a) a VFA register (e.g., a special function register) 126a to store (i) the vector fail address 112 pointing to the vector fetch bus error handler 114, or alternatively (ii) a reset address 130, and optionally (b) a vector fail flag register (e.g., a status register) 126b to store the (optional) vector fail status flag 116 (e.g., one bit). As discussed below, the reset address 130 may point to an instruction to trigger a reset (e.g., a soft reset) of the processor. In some examples the processor 102 may automatically load the reset address 130 in the VFA register 126a during a reset process, which reset address 130 may be replaced by a user initialization of the vector fail address 112.

The external memory 124 may store the vector table 106 including the exception vector 108, the exception handler 110 (which may embody the vector fetch bus error handler 114, indicated at 114a), the optional non-dedicated bus error handler 111 (which may optionally embody the vector fetch bus error handler 114, indicated at 114b), and/or the optional dedicated vector fetch bus error handler 114, indicated at 114c. For example, the vector table 106 may be stored in RAM memory or non-volatile memory (e.g., flash memory or ROM), and the exception handler 110, optional non-dedicated bus error handler 111, and/or optional dedicated vector fetch bus error handler 114c may be stored in stored in non-volatile memory (e.g., flash memory or ROM), or alternatively in RAM memory.

FIG. 3 shows an example process 300 to handle a vector fetch bus error by the example system 100 shown in FIGS. 1-2.

At 302, the processor 102 identifies an exception, e.g., a bus error or other type of exception. At 304, in response to the identified exception, the processor 102 initiates an exception vector fetch to read the exception vector 108 from the vector table 106, wherein the exception vector 108 points to the exception handler 110 (e.g., a bus error handler or other exception handler) for handling the identified exception.

At 306, the exception vector fetch may execute successfully, or alternatively a vector fetch bus error (i.e., a second bus error) may occur. If the exception vector fetch executes successfully, the processor 102 accesses the exception handler 110 (e.g., by loading a program counter (PC) with the exception vector 108) and executes the exception handler 110 at 308. In an example in which the exception in a bus error, and the exception handler 110 is accordingly a bus error handler, the bus error handler may perform a first recovery operation to recover from the bus error (wherein the first recovery operation may be different from a second recovery operation to recover from a vector fetch bus error, e.g., as discussed below at 320).

Alternatively, if a vector fetch bus error occurs at 306, the processor 102 performs accesses and executes the vector fetch bus error handler 114 to recover from the vector fetch bus error. As shown in FIG. 3, depending on the arrangement of the relevant system 100, the process may proceed along different paths based on whether the vector fetch bus error handler 114 is (a) provided as a dedicated vector fetch bus error handler, as indicated at 114c in FIG. 1 or (b) embodied in an existing bus error handler, e.g., embodied in the exception handler 110 associated with the attempted vector fetch at 304 (as indicated at 114a in FIG. 1), or embodied in a non-dedicated bus error handler 111 unrelated to the attempted vector fetch at 304 (as indicated at 114b in FIG. 1).

As shown in FIG. 3, if the vector fetch bus error handler 114 is provided as a dedicated vector fetch bus error handler, the process may proceed to 310 in response to the identified vector fetch bus error at 306. At 310, the processor 102 accesses the vector fail address 112 from the VFA register 126a. (Alternatively, if the VFA register 126a is not initialized with a vector fail address 112, the VFA register 126a may contain the reset address 130 that triggers a processor reset, e.g., as discussed below regarding FIG. 4). At 312, the processor 102 accesses the vector fetch bus error handler 114 (e.g., by loading the program counter (PC) with the vector fail address 112) and executes the vector fetch bus error handler 114 to perform a second recovery operation different than the first recovery operation discussed above at 308 (to recover a non-vector fetch bus error). For example, the vector fetch bus error handler 114 may attempt to confirm whether the vector table 106 is returning bad data by reading it directly. If the data is confirmed to be bad, the vector fetch bus error handler 114 may indicate the fault to the outside world and freeze the relevant application, or enter a self test mode, for example. If the vector table data is determined to the good, the error may be considered transient so the vector fetch bus error handler 114 may enter a self test mode, or just ignore the error and jump to the exception vector 108 in the vector table 106 (i.e., the exception vector 108 the read of which caused the bus vector fetch error).

Alternatively, as shown in FIG. 3, if the vector fetch bus error handler 114 is embodied in an existing bus error handler of the relevant system 100 (e.g., exception handler 110 or non-dedicated bus error handler 111), the process may proceed to 413 in response to the identified vector fetch bus error at 306. At 314, the processor 102 sets the vector fail status flag 116 in the vector fail flag register 126b. At 316, the processor 102 accesses the vector fail address 112 from the VFA register 126a. (Alternatively, if the VFA register 126a is not initialized with a vector fail address 112, the VFA register 126a may contain the reset address 130 that triggers a processor reset, e.g., as discussed below regarding FIG. 4).

At 318, the processor 102 accesses the vector fetch bus error handler 114 (e.g., by loading the program counter (PC) with the vector fail address 112) and initiates execution of the vector fetch bus error handler 114. In this example, the vector fetch bus error handler 114 identifies the vector fail status flag 116 in the vector fail flag register 126b. At 320, the processor 102 continues execution of the vector fetch bus error handler 114 to perform a recovery operation, e.g., based on the identified vector fail status flag set in the vector fail flag register 126b, which indicating the presence of a vector fetch bus error as opposed to non-vector fetch bus errors. For example, the vector fetch bus error handler 114 may perform a second recovery operation different than the first recovery operation discussed above at 308 (to recover a non-vector fetch bus error). For example, the vector fetch bus error handler 114 may perform any of the example operations discussed above at 312.

Figure 4:
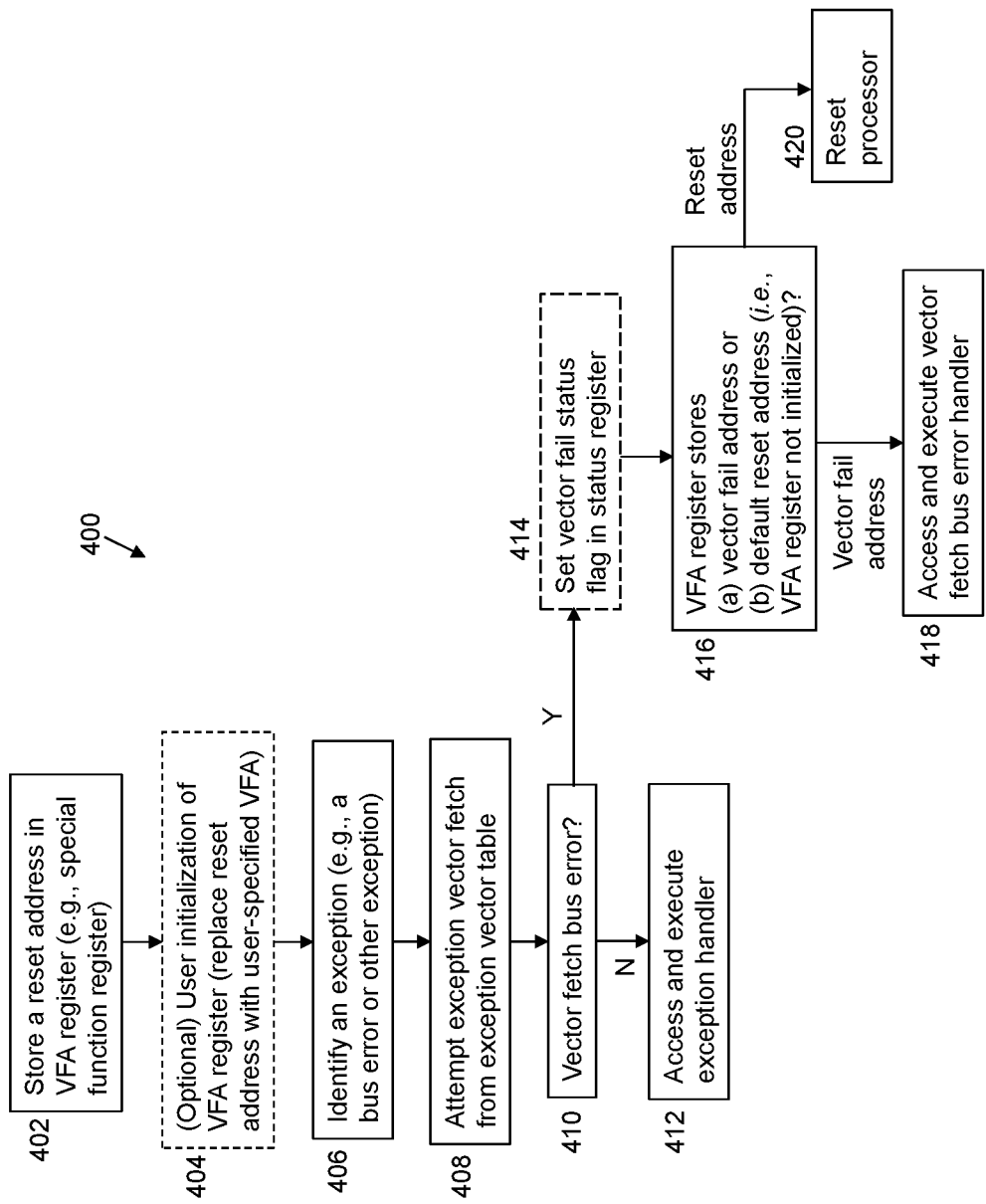
FIG. 4 shows another example process to handle a vector fetch bus error, e.g., by an example system as shown in FIGS. 1-2.

FIG. 4 shows another example process 400 to handle a vector fetch bus error by the example system 100 shown in FIGS. 1-2. The example process 400 illustrates the feature of the VFA register (e.g., special function register) 126a alternatively storing either the vector fail address 112 or the reset address 130.

At 402, the processor 102 stores a reset address in the VFA register 126a (e.g., a user-configurable special function register), wherein the reset address points to a reset instruction that triggers a reset (e.g., a soft reset) of the processor. At 404, an optional user-based (e.g., programmer-based) initialization of the VFA register may occur, to replace the reset address in the user-configurable special function register with a user-specified vector fail address.

At 406, the processor 102 identifies an exception, e.g., a bus error or other exception. At 408, in response to the identified exception, the processor 102 initiates an exception vector fetch to read the exception vector 108 from the vector table 106, wherein the exception vector 108 points to the exception handler 110 for handling the identified exception.

At 410, the exception vector fetch may execute successfully, or alternatively a vector fetch bus error may occur. If the exception vector fetch executes successfully, at 412 the processor 102 accesses the exception handler 110 (e.g., by loading a program counter (PC) with the exception vector 108) and executes the exception handler 110.

Alternatively, if a vector fetch bus error occurs, the processor 102 sets the vector fail status flag 116 in the vector fail flag register 126b at 414. (This step may be omitted in an implementation in which the vector fetch bus error handler 114 is provided as a dedicated vector fetch bus error handler, as discussed above). At 416, the processor 102 accesses the contents of the VFA register 126a. If the VFA register 126a stores the vector fail address 112, the processor 102 accesses the vector fetch bus error handler 114 (e.g., by loading the program counter (PC) with the vector fail address 112) and executes the vector fetch bus error handler 114 to perform a recovery operation at 418. In an example in which the vector fetch bus error handler 114 is embodied in an existing bus error handler (e.g., the exception handler 110 or non-dedicated bus error handler 111 shown in FIG. 1), and the vector fail status flag 116 was set at 414, the bus error handler may identify the vector fail flag 116 (indicating a vector fetch bus error) and perform a defined recovery option for recovering from a vector fetch bus error, e.g., as discussed above at 312 and 320 shown in FIG. 3. Alternatively, referring again to 416, if the VFA register 126a stores the reset address 130 (e.g., if the VFA register 126a was not initialized with the vector fail address 112), the processor 102 may trigger a processor reset (e.g., a soft reset) at 420.

The invention claimed is:

1. A computer system including:
   non-transitory computer-readable memory to store:
     a vector table including an exception vector pointing to an exception handler; and
     a vector fail address of a vector fetch bus error handler; and
   a processor to:
     identify an exception;
     in response to the identified exception, initiate an exception vector fetch to read the exception vector from the vector table;
     identify a vector fetch bus error associated with the exception vector fetch;
     in response to the vector fetch bus error;
       set a vector fail status flag in a status register;
       access the vector fail address of the vector fetch bus error handler; and
       identify the vector fail status flag set in the status register, and in response, execute the vector fetch bus error handler to perform a vector fetch bus error recovery operation.

2. The computer system of claim 1, wherein:
the exception handler comprises a bus error handler; and
the exception comprises a bus error.

3. The computer system of claim 2, wherein the bus error comprises the vector fetch bus error handler.

4. The computer system of claim 2, wherein the vector fetch bus error handler is separate from the bus error handler.

5. The computer system of claim 1, wherein the non-transitory computer-readable memory comprises flash memory to store the vector table.

6. The computer system of claim 1, wherein the non-transitory computer-readable memory comprises a register to store the vector fail address of the vector fetch bus error handler.

7. The computer system of claim 1, wherein the non-transitory computer-readable memory comprises a special function register of the processor to store the vector fail address of the vector fetch bus error handler.

8. A method, comprising:
identifying, by a processor, an exception;
in response to the identified exception, initiating, by the processor, an exception vector fetch to read an exception vector from a vector table stored in non-transitory computer-readable memory;
identifying, by the processor, a vector fetch bus error associated with the exception vector fetch; and
in response to the vector fetch bus error:
setting, by the processor, a vector fail status flag in a status register;
accessing, by the processor, a vector fail address stored in non-transitory computer-readable memory, the vector fail address pointing to a vector fetch bus error handler; and
identifying, by the processor, the vector fail status flag set in the status register, and in response, executing, by the processor, the vector fetch bus error handler to perform a vector fetch bus error recovery operation.

9. The method of claim 8, wherein:
the exception comprises a bus error; and
the exception vector points to a bus error handler.

10. The method of claim 9, wherein the bus error handler comprises the vector fetch bus error handler.

11. The method of claim 10, comprising:
prior to identifying the exception:
identifying a non-vector fetch bus error, the non-vector fetch bus error comprising a bus error unrelated to a vector fetch; and
effecting a first execution of the bus error handler including executing a first recovery operation associated with the non-vector fetch bus error;
wherein executing the vector fetch bus error handler in response to the vector fetch bus error comprises executing a second recovery operation associated with the vector fetch bus error, wherein the second recovery operation is different than the first recovery operation.

12. The method of claim 9, wherein the vector fetch bus error handler is separate from the bus error handler.

13. The method of claim 8, wherein accessing, by the processor, the vector fail address stored in non-transitory computer-readable memory comprises accessing the vector fail address from a register of the processor.

14. A method, comprising:
storing a reset address in a user-configurable special function register;
wherein the reset address in the user-configurable special function register is replaceable with a user-specified vector fail address in response to a user input;
identifying, by a processor, an exception;
in response to the identified exception, initiating, by the processor, an exception vector fetch to read an exception vector from a vector table stored in non-transitory computer-readable memory;
identifying, by the processor, a vector fetch bus error associated with the exception vector fetch; and
in response to the identified vector fetch bus error:
accessing, by the processor, user-configurable special function register;
if the accessed special function register stores the user-specified vector fail address pointing to the vector fetch bus error handler, accessing and executing the vector fetch bus error handler; and
if the accessed special function register stores the reset address, accessing the reset address and resetting the processor.

15. The method of claim 14, wherein:
the exception comprises a bus error; and
the exception vector points to a bus error handler.

16. The method of claim 15, wherein the bus error handler comprises the vector fetch bus error handler.

17. The method of claim 14, wherein the vector fetch bus error handler is separate from the bus error handler.

* * * * *